C. W. ROBINSON AND E. BASEMAN.
BUNDLE CARRIER FOR HARVESTERS.
APPLICATION FILED APR. 7, 1917.
1,388,306.
Patented Aug. 23, 1921.
2 SHEETS—SHEET 2.
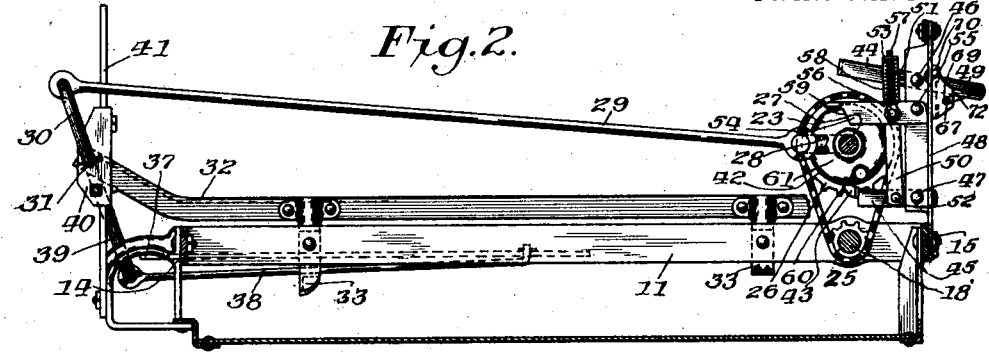
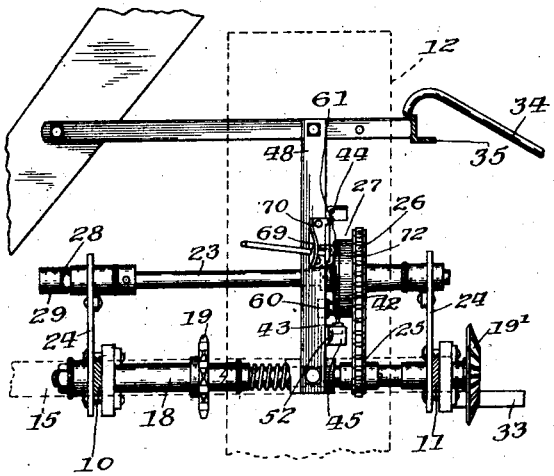
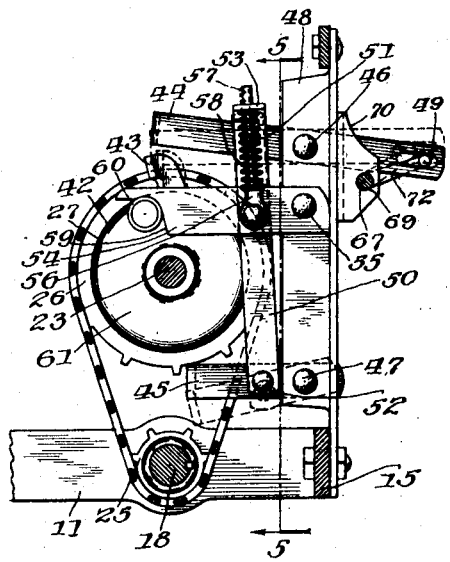
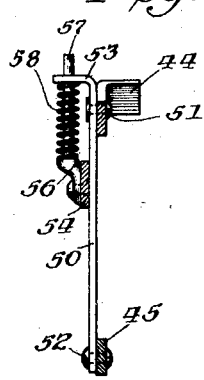
Inventor
Charles W. Robinson,
And Ernest Baseman.
By Chas. E. Lord
Atty

UNITED STATES PATENT OFFICE.

CHARLES W. ROBINSON AND ERNEST BASEMAN, OF HAMILTON, ONTARIO, CANADA, ASSIGNORS, BY MESNE ASSIGNMENTS, TO INTERNATIONAL HARVESTER COMPANY, OF CHICAGO, ILLINOIS, A CORPORATION OF NEW JERSEY.

BUNDLE-CARRIER FOR HARVESTERS.

1,388,306.      Specification of Letters Patent.      Patented Aug. 23, 1921.

Application filed April 7, 1917. Serial No. 160,512.

*To all whom it may concern:*

Be it known that we, CHARLES W. ROBINSON and ERNEST BASEMAN, citizens of the United States, and residents, respectively, of Hamilton, in the county of Wentworth, Province of Ontario, Dominion of Canada, and of Hamilton, in the county of Wentworth, Province of Ontario, Dominion of Canada, have invented certain new and useful Improvements in Bundle-Carriers for Harvesters, of which the following is a full, clear, and exact specification.

Our invention relates to bundle carriers for harvesters, and more particularly to power operated means for controlling the carrier.

The invention has among its objects to provide power operated means connected to the traction wheel of a harvester, or to some other suitable source of power, for actuating the bundle carrier to sheaf discharging position and for returning the same to sheaf receiving position after the load has been discharged.

A further object is to provide manually controlled mechanism whereby the carrier may be dumped and returned to receiving position by power derived from the harvester main wheel, or some other suitable source.

A still further object is to provide means under the control of the operator whereby the power connections can be applied to dump the carrier, hold the same in dumping position for the desired length of time, and to return the carrier by power to sheaf receiving position.

These objects are attained by means of mechanism, such as clutch mechanism, for intermittently connecting the bundle carrier with a power operated shaft on the harvester, said mechanism being positively controlled by means, such as treadle mechanism, whereby the operator may at will dump the carrier and return the same to receiving position by power derived from some suitable source, or may dump the carrier, hold the same in dumping position, and, by means of the power connections, return the same to receiving position.

In the accompanying drawings we have illustrated one embodiment of our invention, and in these drawings—

Fig. 2 is an elevational view of the mechanism shown in Fig. 1 looking toward the right, certain parts being shown in section and other parts being omitted for the sake of clearness;

Fig. 3 is a rear elevation of the gearing and clutch mechanism shown in Fig. 1;

Fig. 4 is an enlarged detail view of the mechanism shown at the right in Fig. 2;

Fig. 5 is a sectional view taken on line 5—5 of Fig. 4; and

Fig. 6 is a detail view of the clutch controlling mechanism shown in Fig. 4.

Figure 1:
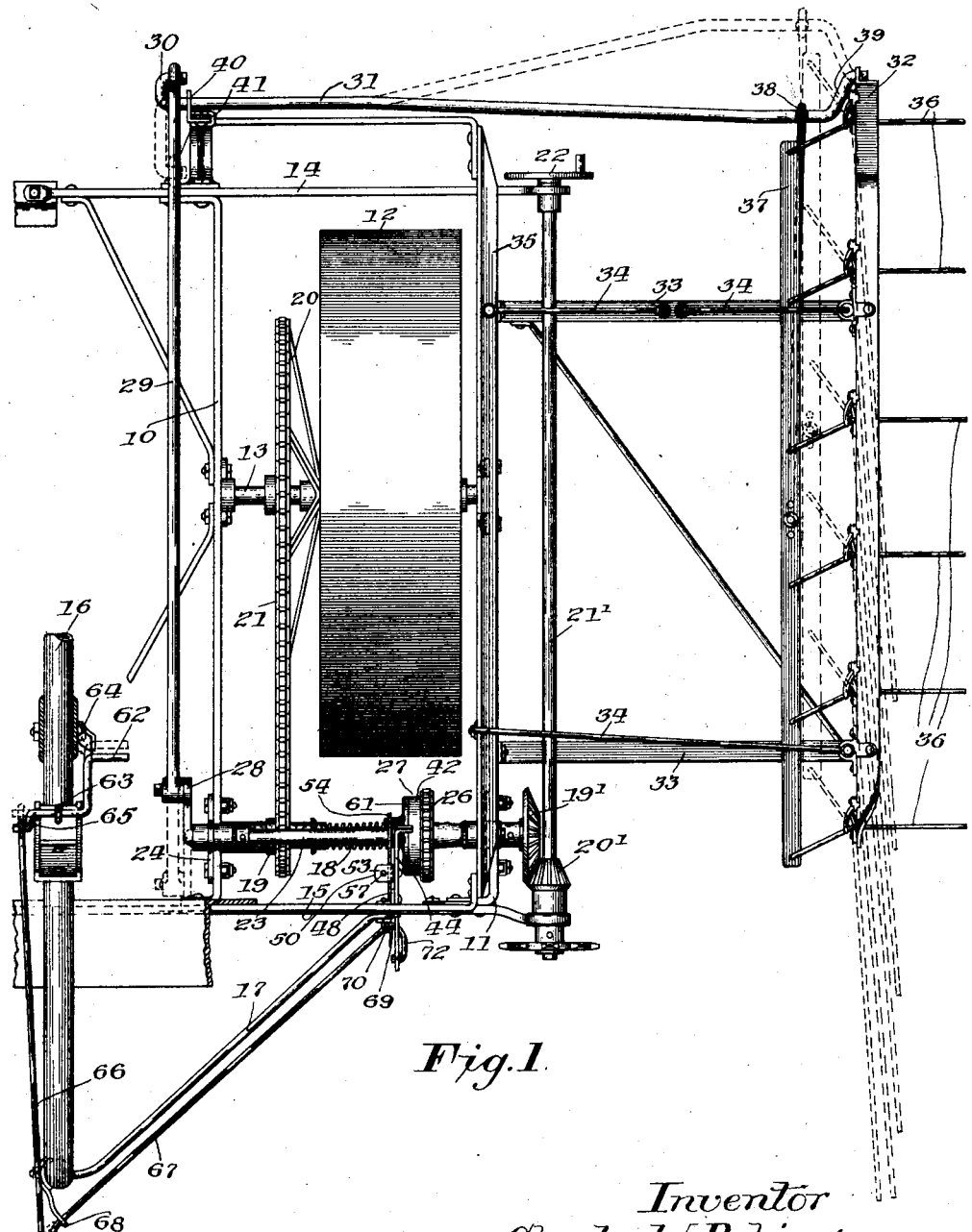
Figure 1 is a top plan view of the stubbleward end of a harvester having attached thereto a bundle carrier and showing the connections between the carrier and the traction wheel of the harvester.

The harvester, a portion of which is shown in Fig. 1, is of standard type and includes longitudinally disposed frame members 10 and 11, between which is mounted a traction wheel 12 on a shaft 13, and connecting the longitudinally disposed members are front and rear frame members 14 and 15. The harvester is also provided with the usual seat pipe 16, a brace 17 for the pipe, and cross shaft 18 connected by means of sprockets 19 and 20 and chain 21 to the main axle 13 and driven by the traction wheel 12. The shaft 18 carries on its stubbleward end the usual gear $19^1$, which meshes with a gear $20^1$ carried by crank shaft $21^1$, which latter is provided at its front end with a crank disk 22 which can be connected to the cutting apparatus. A supplemental shaft 23 is journaled in frame members 24 vertically above the cross shaft 18 and is connected with said shaft by means of sprockets 25, 26 and clutch mechanism 27, which will be hereinafter more fully described. The shaft 23 is provided on its grainward end with a crank 28 connected by means of a pitman 29 with a crank 30 integral with a transversely extending rod 31 journaled at its grainward end in an angular bracket 40 carried by the harvester frame and journaled at its stubbleward end in a longitudinal frame member 32. The frame member 32, which constitutes the support for the bundle carrier, is connected by means of rigid bars 33 with the longitudinal frame member 11. Supplemental reinforcing rods 34 are also provided, these rods being connected at their grainward ends to a longitudinal frame member 35 vertically spaced from the frame member 11 and carried at the stubbleward side of the harvester frame.

The bundle carrier is made up of tines 36 provided on their grainward ends with integral U-shaped extensions, one leg of these extensions being journaled in the frame member 32 and the other and downwardly extending leg being carried by a longitudinally reciprocable bar 37. (For a more detailed description of this construction see patent to John F. Steward, 482,931, dated September 20, 1892.) This bar is connected by means of a link 38 to the rod 31 intermediate the ends thereof. From the plan view in Fig. 1, it will be seen that the rod 31 is provided intermediate its ends and adjacent the connection with a link 38 with a crank portion 39, so that when this rod is oscillated the bar 37, through the link connection 38, will be reciprocated, thereby folding the bundle carrier tines, as shown by dotted lines in Fig. 1. The structure of this bundle carrier will not be herein more specifically described, since *per se* it forms no part of the present invention and is fully illustrated and described in the patent to John F. Steward, No 482,931, issued September 20, 1892.

Turning to the structure shown in detail in Figs. 2 to 4, inclusive, we will now describe the clutch mechanism whereby the power connections between the traction wheel and the sheaf carrier are controlled. The clutch illustrated is the common form of harvester clutch, and for this reason has not been shown in detail. This mechanism, briefly, comprises a constantly rotating member 42 journaled on the shaft 23 and intermittently rotating mechanism controlled by a pawl 43. This pawl 43 is connected to the shaft 23 and is normally spring-pressed into engagement with the clutch member 42. (For a more detailed description of this clutch mechanism see patent to B. R. Benjamin, 994,711, June 13, 1911.) When, however, said pawl is engaged by the detents or dogs below described, the same is held out of engagement with the clutch member 42 against the tension of the spring and no rotation of the shaft 23 is effected. For controlling the pawl 43, two detents or dogs 44, 45 are employed, these detents being pivoted at 46, 47 to a vertical frame member 48, the extended end of the detent 44 being slotted, as shown at 49. The detents 44 and 45 are connected by means of a link 50 pivoted to said detents, respectively, at 51 and 52, said link 50 being laterally offset at its upper end, as shown at 53. A stop 54 is pivoted at 55 to the frame member 48 and has pivoted thereto intermediate its ends a lug 56 having a vertically extending shank 57 passing through an aperture in the offset end 53 of link 50.

Intermediate the lug 56 and end 53 of link 50 and surrounding the shank 57, we have provided a compression spring 58. The stop 54 is recessed or cut away at its free end, as shown at 59, and this recessed end receives a roller 60, carried by a disk 61 secured to the pawl 43, in one position of rotation of said roller about the shaft 23.

The operating mechanism for the clutch consists of a treadle 62 pivoted at 63 on the seat post 16 and limited in its forward movement by means of a stop 64. The grainward end of this treadle carries a crank 65 connected by means of a link 66 to the rear end of a cranked rod 67 journaled at its grainward end in a bracket 68, secured to the seat post and journaled adjacent its stubbleward end in an eye 69 carried by a bracket 70 secured to the vertical frame member 48 of the harvester. The rod 67 is provided beyond the bracket 70 with a rearwardly extending crank arm 72, and this crank arm passes through the slot 49 at one end of the detent 44 and is secured therein.

As shown in detail in Fig. 6, the bracket 70 is provided at one end with a notch 73 through which extends the detent 44, and the walls of this notch limit the vertical movement of said detent.

The operation of the mechanism above described is as follows: When the parts are in the position shown in full lines in Figs. 1 and 2, the bundle carrier is in sheaf receiving position. In order to dump the carrier, the operator presses against the treadle 62 and by means of the connecting links 66 and 67 lowers the detent 45 and with it the detent 44. Referring to Fig. 2, as the detent 45 is forced away from the pawl 43, the pawl is pressed by means of its controlling spring into engagement with the clutch disk 42 and thereby the shaft 23 is rotated. As this shaft is rotated, the bundle carrier is actuated to dumping position shown by dotted lines in Fig. 1 by means of the crank 28, connecting rod 29, cranked rod 31, link 38 and bar 37. When the foot treadle 62 is depressed and maintained in a depressed position as shown in dotted lines in Fig. 1, the pawl 43 completes one-half of one revolution starting from the position shown in Fig. 2 and is locked in the dotted line position shown in Fig. 4. If the operator continues to press upon the treadle 62, the crank rod 67, which is connected to the rear end of the detent 44, will maintain the detents 44 and 45 in the position shown by dotted lines in Fig. 4, thus locking the pawl 43 against detent 44 and thereby throwing the shaft 23 out of clutch with the constantly rotating clutch member 42. In the one-half revolution of the disk 61 from the position shown in Fig. 2 to the position shown in Fig. 4, the roller 60 is carried into the recessed end 59 of the stop 54. In this position the downward movement of the stop 54 is limited and therefore the detent 44 will be held in its dotted line position against the tension of the spring 58. When the foot of the operator is released from the treadle 62, the detents 44 and 45 will again resume their full line position and the pawl 43 will again be forced outwardly into contact with the clutch disk 42 and will connect the shaft 23 to the power shaft 18 and return the bundle carrier to sheaf receiving position. Fig. 4 illustrates the position of the pawl 43 just as the pressure is released from the foot treadle 62, and disk 61 is starting on the half revolution which returns the bundle carrier to bundle receiving position. It will be seen in the dotted line position of Fig. 4 that while the foot treadle 62 is pressed the bundle carrier is retained in a dumped position and the roller 60 is locked against stop member 54 for the purpose of preventing the crank member 28 from rotating in a reverse direction to a point over dead center. Thus the engagement of roller 60 with stop 54 holds the bundle carrier in a dumped position.

From the above description it will be seen that we have provided power connections between the traction wheel of a harvester and the sheaf carrier whereby the operator may at will connect the traction wheel with the sheaf carrier operating mechanism to dump the carrier and return the same to receiving position, or whereby the carrier may be held in dumping position for any desired length of time and until the bundles are all discharged, and then be returned to sheaf receiving position by means of the power connections.

Having shown and described the preferred form of our invention, it is to be understood that this form is shown merely for the purpose of illustration and that other embodiments may be employed without departing from the spirit of our invention.

What we claim as new and desire to secure by Letters Patent is:

1. In a harvester, a bundle carrier comprising a plurality of extending tines, means including a constantly driven mechanism for actuating said tines and dumping said bundle carrier, and means for controlling said constantly driven mechanism operating upon a single actuation to connect said driven mechanism to said carrier to dump said carrier and retain the carrier in dump position until released.

2. In a harvester, a bundle carrier comprising a plurality of extending tines, means including a constantly driven member for actuating said tines and dumping said carrier and returning same to normal position, means for controlling said constantly driven member operating by two movements thereof to connect said constantly driven member to said carrier to dump said carrier and return the carrier to sheaf receiving position.

3. In a harvester, a frame, a power driven shaft journaled thereon, a bundle carrier carried thereby, power connections between said shaft and said bundle carrier, and means for controlling said power connections for actuating said carrier by power to sheaf discharging position, for retaining said carrier in said position for any desired interval of time, and for returning said carrier by power to sheaf receiving position by two movements of said controlling means.

4. In a harvester, a frame, a power driven shaft journaled thereon, a bundle carrier carried thereby, clutch mechanism interposed between said shaft and said bundle carrier, and means including said clutch after a single movement thereof and controlling means therefor operating to disconnect said carrier from said shaft when the carrier has been actuated to sheaf discharging position.

5. In a harvester, a foldable bundle carrier, means for folding said carrier, tractive power connections for actuating said folding means, and manually controlled mechanism for said power connections for retaining said carrier in folded position after a single movement of said controlling mechanism.

6. In a harvester, a foldable bundle carrier, means for folding the same, power operating mechanism for said bundle carrier including a power driven shaft, a clutch mechanism carried by said shaft for controlling said power operating mechanism, means under the control of the operator and including said clutch for determining the amount of rotation of said power driven shaft, said means operating upon a single movement thereof to check the rotation of said power driven shaft after it has rotated one-half of one revolution.

7. In a harvester, a foldable bundle carrier, means including a crank shaft for folding said carrier, power connections for actuating said crank shaft, and manually controlled mechanism for said power connections for checking the rotation of said shaft after said shaft has rotated a whole or a half of one revolution.

8. In a harvester, a frame, a power driven shaft journaled thereon, a bundle carrier carried thereby, a supplemental shaft journaled in said frame, means including clutch mechanism for operatively connecting said shafts, power connections between said supplemental shaft and said bundle carrier, and means for controlling said clutch mechanism whereby after a single actuation of said controlling means said supplemental shaft will be disconnected from said power driven shaft when the former has made one-half of one revolution and moved said carrier to sheaf discharging position.

9. In a harvester, a frame, a power driven shaft journaled thereon, a bundle carrier carried thereby, a supplemental shaft journaled on said frame, means including a clutch mechanism for operatively connecting said shafts, said clutch mechanism including a constantly rotating member carried by said shaft, a pawl secured to said shaft, oppositely disposed detents for determining the amount of rotation of said pawl and shaft, power connections between said supplemental shaft and said bundle carrier, and manually controlled means for actuating said detents to determine the amount of rotation of said supplemental shaft.

10. In a harvester, a bundle carrier, a source of power, mechanism operatively connected to said source of power for dumping said carrier and returning said carrier to normal position, and controlling means for the operative connections between said source of power and said mechanism including means for connecting said mechanism to said source of power to dump said carrier and for automatically disconnecting said mechanism from said source of power to retain said carrier in dumped position by a single actuation of said controlling means.

11. In a harvester, a foldable bundle carrier, means including a crank shaft for folding said carrier, power connections for actuating said crank shaft and manually controlled mechanism for said power connections for checking the rotation of said shaft after said shaft has rotated a whole or a part of one revolution.

In testimony whereof we affix our signatures in the presence of two witnesses.

CHARLES W. ROBINSON.
ERNEST BASEMAN.

Witnesses:
JOHN H. C. THOMPSON,
W. C. THOMPSON.